C. BARNUM.
VINE SEPARATOR.
APPLICATION FILED OCT. 7, 1909.
956,027.
Patented Apr. 26, 1910.
3 SHEETS—SHEET 1.
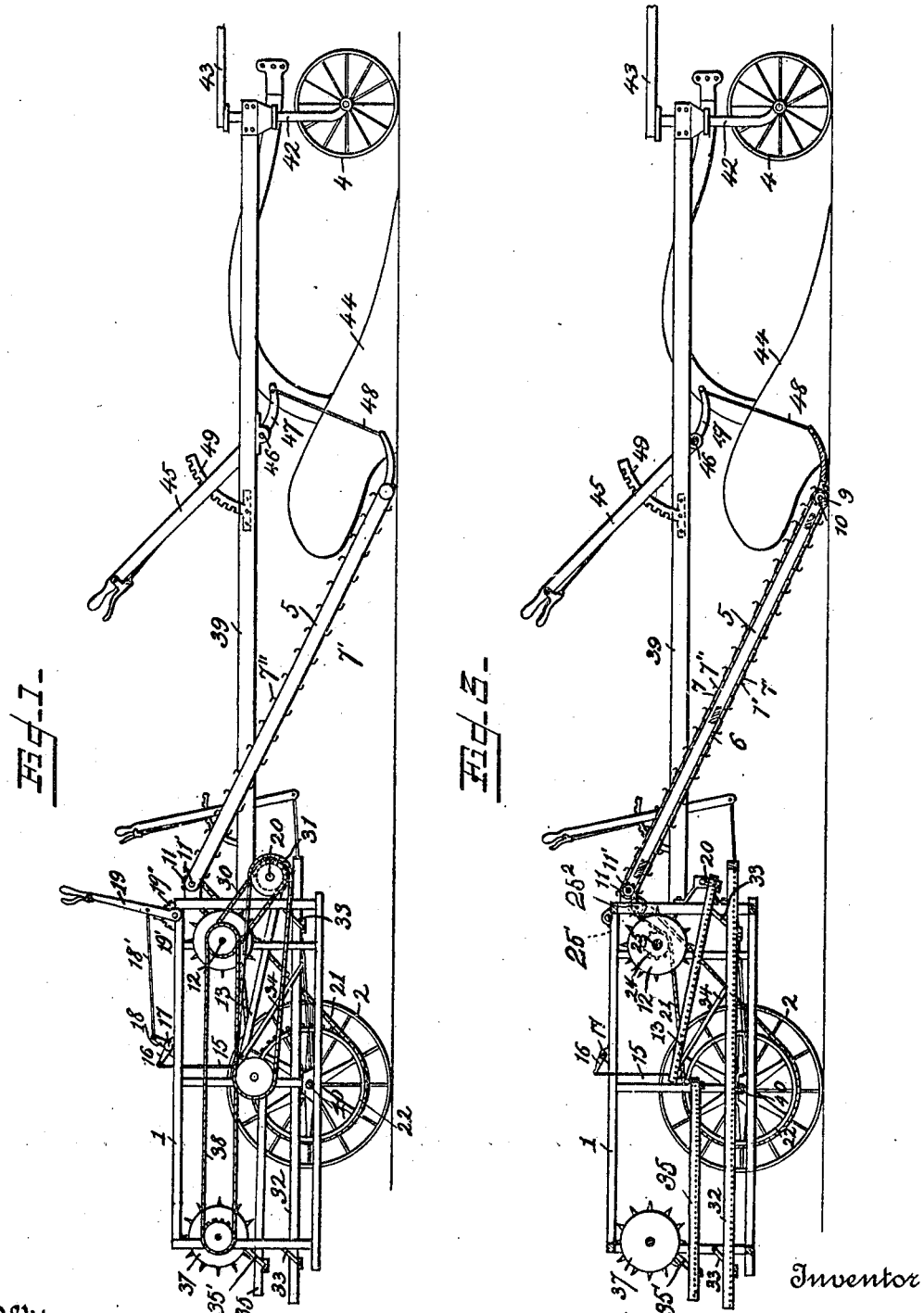
Witnesses
F. L. Ourand
C. H. Griesbauer
Inventor
Charles Barnum
by H. B. Willson & Co
Attorneys C. BARNUM.
VINE SEPARATOR.
APPLICATION FILED OCT. 7, 1909.
956,027.
Patented Apr. 26, 1910.
3 SHEETS—SHEET 2.
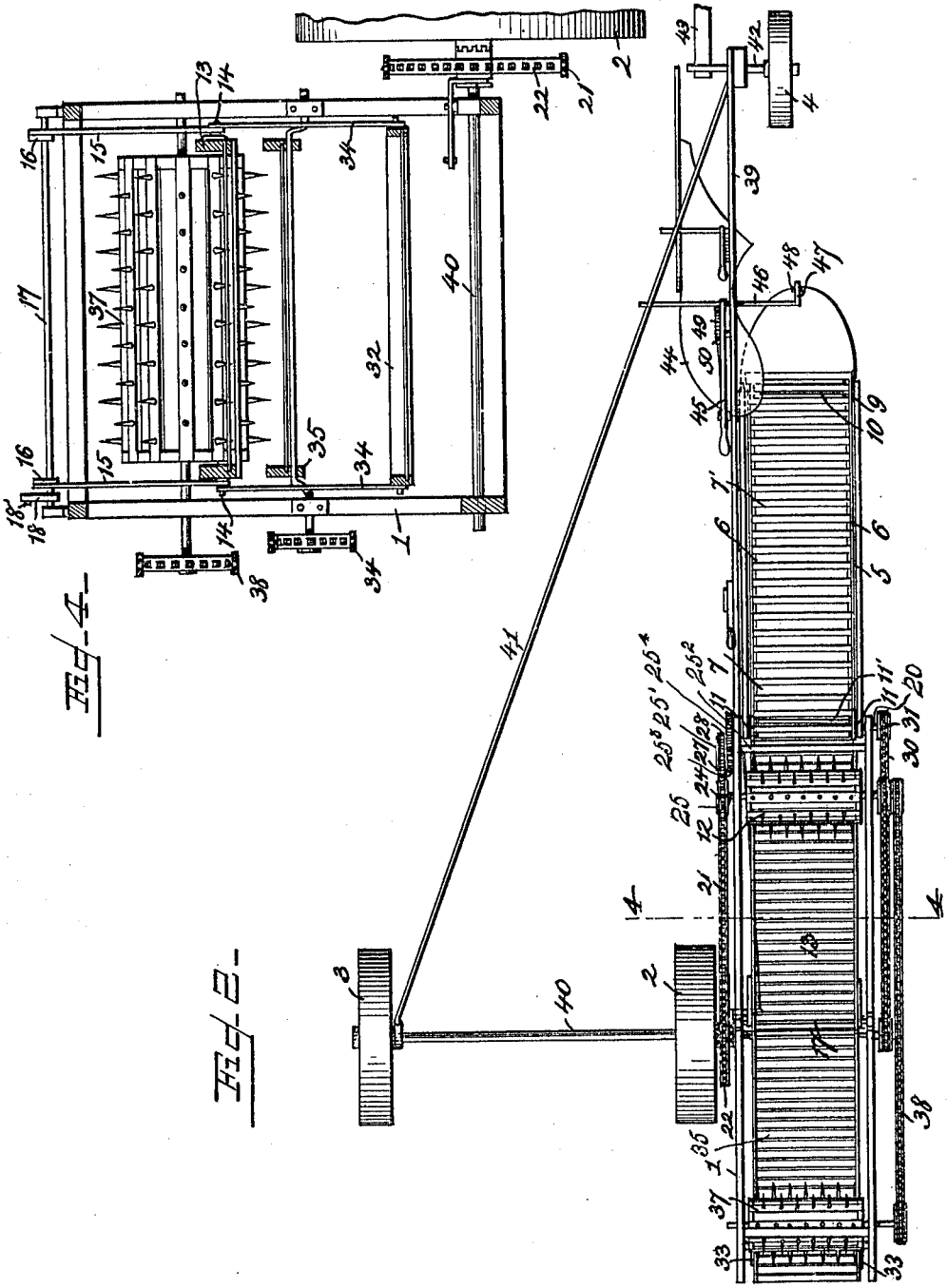
Witnesses
F. L. Durand
C. H. Griesbauer
Inventor
Charles Barnum
by H. B. Willson &co
Attorneys

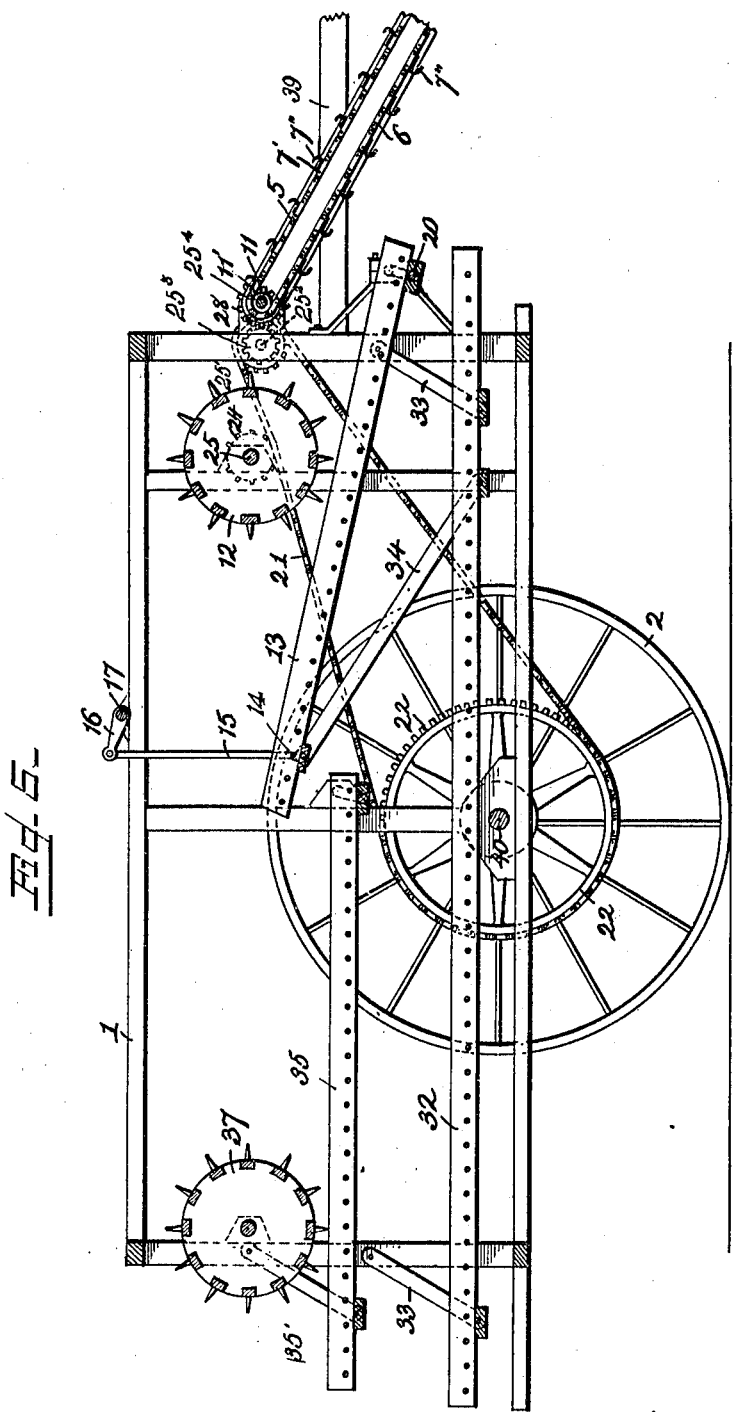

UNITED STATES PATENT OFFICE.

CHARLES BARNUM, OF WABASSO, MINNESOTA.

VINE-SEPARATOR.

956,027.     Specification of Letters Patent.     Patented Apr. 26, 1910.

Application filed October 7, 1909. Serial No. 521,437.

*To all whom it may concern:*

Be it known that I, CHARLES BARNUM, a citizen of the United States, residing at Wabasso, in the county of Redwood and State of Minnesota, have invented certain new and useful Improvements in Vine-Separators; and I do declare the following to be a full, clear, and exact description of the invention, such as will enable others skilled in the art to which it appertains to make and use the same.

This invention relates to a root or vine separator and has for its object to provide a simple and efficient machine of this type which will successfully cause the separation of the vines or roots from the dirt.

With this and other objects in view, the invention consists of certain novel features of construction, combination and arrangement of parts as will be more fully described and particularly pointed out in the appended claims.

In the drawings, Figure 1 is a side elevation of the complete machine; Fig. 2 is a plan view, with certain of the parts omitted for the sake of clearness. Fig. 3 is a central longitudinal section thereof; and Fig. 4 is a vertical transverse section taken on line 4—4 of Fig. 2, and Fig. 5 is a longitudinal section taken through the main portion of the machine with the parts represented on an enlarged scale.

Referring to the drawings for a more particular description of the invention, the device comprises a supporting frame 1 which is mounted upon the supporting wheels 2 and 3 and a guide wheel 4. An endless carrier 5 is arranged at the desired inclination in front of the frame 1 and consists of the sprocket chains 6 and the apron 7 consisting of a series of transverse bars 7′ provided at their forward edges with the upturned portions 7″. The sprocket chains of the carrier pass over the sprocket wheels 9 arranged at the opposite ends of the shaft 10 at the lower end of the carrier and over other sprocket wheels 11 arranged at the opposite ends of a shaft 11′ arranged at the front of the frame 1. A toothed crushing cylinder 12 is revolubly mounted in the supporting frame in rear of the upper end of the carrier 5 to receive the dirt and vines or roots and deliver them upon the slatted shaking frame 13 mounted beneath the cylinder 12. The rear end of the shaking frame 13 is provided with stub shafts 14 which are pivotally mounted in the lower ends of the links 15 depending from the arms 16 of the rock shaft 17 mounted upon the frame 1 and connected by the arm and link 18 and 18′, respectively, with the operating lever 19 provided with a spring controlled pawl 19′ adapted to engage a rack 19″. By this arrangement, the rear end of the shaking frame may be raised or lowered to adjust the same at the proper inclination. The front end of the shaking frame is connected with a crank shaft 20 mounted in suitable bearings at the front end of the supporting frame 1. The toothed crushing cylinder 12 is rotated by a sprocket chain 21, which passes over a sprocket gear 22 mounted at one side of the wheel 2 and engages a sprocket wheel 24 arranged at one end of the shaft 25 carrying said toothed cylinder. The front end of the chain 21 passes over a sprocket wheel 25′ mounted at the front of the supporting frame. A gear wheel $25^3$ is mounted on the shaft $25^2$ of the sprocket wheel 25′ and intermeshes with a gear $25^4$, whereby motion is transmitted from the shaft $25^2$ to the shaft 11 to drive the carrier. Motion is also imparted from the shaft of cylinder 12 to the crank 20 by a sprocket chain 30 passing over a sprocket wheel 31 on said crank shaft. As the crank shaft 20 turns or rotates, the front end of the shaking frame 13 is oscillated to effect the separation of the dirt from the roots or vines, the dirt passing through the slats of the shaking frame upon the screen 32 mounted for oscillatory movement upon the links 33, beneath the shaking frame. This screen catches any of the smaller vines or roots which pass from the slats of the frame 13.

The screen 32 is oscillated by the links 34 connected at their lower ends with the screen and at their opposite ends with the shaking frame 13. The dirt and vines which do not drop through the shaking frame 13 pass to the screen 35, which is oscillatorily mounted on the frame in the rear of the shaking frame 13. The remainder of the dirt is broken up by the toothed cylinder 37 and passes through the screen 35, upon the screen 32, through which it passes to the ground, while the roots or vines are carried to the rear and pass off the rear end of the screen 35. The cylinder 37 is driven by a chain 38 passing over sprocket wheels on the cylinder shafts. The screen 35 is oscillated by the links 35′ connected at their lower ends with the rear end of the screen and eccentrically connected at their upper ends with the ends of the cylinder 37 previously referred to.

A longitudinal frame bar 39 extends from one end of the main axle 40 in front of the carrier and a second frame bar 41 extends from the opposite end of the axle to the front end of the frame bar 39. The guide wheel 4 is swiveled at the front ends of the frame bars, to the axle 42 of which is suitably connected the draft tongue 43 to which the draft animals are attached. A plow 44 is attached to the frame bar 39 at one side of the carrier and in position to throw the dirt on the front end of the carrier. The front end of the carrier may be raised or lowered to the proper depth by the raising lever 45 which is connected with the transverse rock shaft 46 extending through the frame bars 39 and 41 and provided at one end with a right angularly bent arm 47 connected by the link 48 to the front end of the carrier. A rack 49 is bolted to the frame bar 39 and coöperates with a locking pawl 50 carried by the lever 45 in locking said lever in adjusted position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. A vine separator comprising a frame, a carrier arranged in advance thereof, a plow to throw the dirt and vines upon the carrier, a shaking frame mounted for oscillatory movement at the front end of the frame, a toothed crushing cylinder to receive the dirt and vines from the carrier and to break up the dirt, revolubly mounted above said frame, a screen oscillatorily mounted beneath the shaking frame, and means for driving the toothed cylinder and carrier and for operating the shaking frame and screen.

2. A vine separator comprising a supporting frame, an endless inclined carrier arranged in front of the frame, a toothed cylinder to receive the dirt and vines from the carrier and break up the dirt, a shaking frame reciprocatorily mounted beneath the toothed cylinder to shake the dirt from the vines, a shaking screen oscillatorily mounted in the rear of the shaking frame, a screen oscillatorily mounted beneath the shaking frame and first mentioned screen, a second toothed cylinder arranged at the rear end of the frame over the first mentioned screen, and means for driving the cylinders and carrier and for operating the screens and the shaking frame.

3. A vine separator comprising a supporting frame, an endless inclined carrier arranged in front of the frame, a toothed cylinder to receive the dirt and vines from the carrier and break up the dirt, a shaking frame reciprocatorily mounted beneath the toothed cylinder to shake the dirt from the vines, a shaking screen oscillatorily mounted in the rear of the shaking frame, a screen oscillatorily mounted beneath the shaking frame and first mentioned screen, a second toothed cylinder arranged at the rear end of the frame over the first mentioned screen, means for driving the cylinder and carrier and for operating the screens and the shaking frame, and means for adjusting the rear end of the shaking frame vertically.

4. A vine separator comprising a supporting frame, an endless inclined carrier arranged in front of the frame, a toothed cylinder to receive the dirt and vines from the carrier and break up the dirt, a shaking frame reciprocatorily mounted beneath the toothed cylinder to shake the dirt from the vines, a shaking screen oscillatorily mounted in the rear of the shaking frame, a screen oscillatorily mounted beneath the shaking frame and first mentioned screen, a second toothed cylinder arranged at the rear end of the frame over the first mentioned screen, means for driving the cylinder and carrier and for operating the screens and the shaking frame, means for adjusting the rear end of the shaking frame vertically, and means for adjusting the front end of the carrier frame vertically.

5. A vine separator comprising a supporting frame, an endless carrier arranged in front of the frame, a toothed cylinder to receive the dirt and vines from the carrier and to break up the dirt, a shaking frame reciprocatorily mounted beneath the toothed cylinder to separate the dirt from the vines, a shaking screen oscillatorily mounted in rear of the shaking frame, a second screen similarly mounted beneath the shaking frame and the first mentioned screen, a second toothed cylinder mounted at the rear end of the frame above the first mentioned screen and means for driving the cylinder and carrier and for operating the screens and shaking frame.

In testimony whereof I have hereunto set my hand in presence of two subscribing witnesses.

CHARLES BARNUM.

Witnesses:
PAUL A. CALLAGHAN,
ELSIE HOWE.